United States Patent [19]
Winkelmann et al.

[11] Patent Number: 5,256,109
[45] Date of Patent: Oct. 26, 1993

[54] DRIVE DEVICE

[75] Inventors: Siegfried Winkelmann, Tettnang; Horst Rögner, Friedrichshafen, both of Fed. Rep. of Germany

[73] Assignee: ZF Friedrichshafen AG, Fed. Rep. of Germany

[21] Appl. No.: 955,873

[22] PCT Filed: Jun. 11, 1991

[86] PCT No.: PCT/EP91/01085
§ 371 Date: Dec. 9, 1992
§ 102(e) Date: Dec. 9, 1992

[87] PCT Pub. No.: WO91/19918
PCT Pub. Date: Dec. 26, 1991

[30] Foreign Application Priority Data
Jun. 13, 1990 [DE] Fed. Rep. of Germany ....... 4018938

[51] Int. Cl.⁵ .............................................. F16H 59/00
[52] U.S. Cl. ......................................... 474/28; 474/18
[58] Field of Search ................... 474/8, 11, 12, 17, 18, 474/28, 69, 70

[56] References Cited

U.S. PATENT DOCUMENTS

| 4,717,368 | 1/1988 | Yamaeuchi et al. | 474/28 |
| 4,735,597 | 4/1988 | Cadée | 474/18 X |
| 4,846,765 | 7/1989 | Sakai | 474/28 |

FOREIGN PATENT DOCUMENTS

| 1284779 | 12/1968 | Fed. Rep. of Germany . |
| 2118083 | 1/1973 | Fed. Rep. of Germany . |
| 2560653 | 5/1976 | Fed. Rep. of Germany . |
| 3242448 | 5/1983 | Fed. Rep. of Germany . |
| 3830165 | 3/1989 | Fed. Rep. of Germany . |
| 0815416 | 6/1959 | United Kingdom . |
| 2036204 | 6/1980 | United Kingdom . |

Primary Examiner—Thuy M. Bui
Attorney, Agent, or Firm—Davis, Bujold & Streck

[57] ABSTRACT

The invention concerns a drive device (7) with variable transmission ratio for driving an auxiliary aggregate of a motor vehicle. A belt pulley (11) of the drive device (7) has a chamber (38) connected to a reservoir (30) of a hydraulic medium. The centrifugal action of the hydraulic medium contained in the chamber (38) is used to change the speed of the driven shaft (13). By applying a supporting pressure to the chamber (38), it is possible additionally to vary the output speed of the drive device (7).

12 Claims, 3 Drawing Sheets

DRIVE DEVICE

The invention concerns a drive device for transmitting torque between a drive shaft having a first belt pulley and a driven shaft having a second belt pulley. The first belt pulley has an axially fixed flange non-rotably connected with the drive shaft and a flange axially movable under the action of a pre-load apparatus. The second belt pulley is composed of an axially fixed flange non-rotably connected with the drive shaft and an axially movable flange, the axially movable flange forming, with a flange of the driven shaft, a chamber for carrying a hydraulic medium.

A drive device constructed as described above is especially used in the driving of auxiliary aggregates in motor vehicles. Such a device can here be, for instance, a generator, an air-conditioning compressor, or an air-charge compressor. In the driving of auxiliary aggregates the problem of reaching a sufficiently high speed generally arises, even at low engine speeds; on the other hand, said speeds should not be too high in the upper range of the engine speeds. This requirement can be met by using a drive device having a non-linear characteristic line. By a characteristic line it is here to be understood the ratio of the speeds of the drive and of the driven shaft of the drive device. The use of centrifugal force to change the characteristic line for the controlled drive of an auxiliary aggregate has been disclosed (DE 32 42 448 A1). Even though an adaptation, in the sense explained, can be obtained with such regulating forces, the reproducibility of the speed ratios of the driven to the driven shaft of the drive device is subject to great divergences. Said circumstance also exists mainly with the use of a plate or coil spring. Small fluctuations of the controlling and restoring forces resulting from differing friction and leverage ratios can already produce great deviations from the desired speeds of the driven shaft.

To adjust hydraulically the position of the flange of the belt pulleys has also been disclosed (DE 21 18 083 A1, DE 25 60 653 C2). In order that the pressures acting upon the belt pulleys not be tampered with by centrifugal force depending on the speed, special precautions have been taken to compensate the effect of the centrifugal force upon the hydraulic medium.

In the construction according to DE 38 30 165 A1, the position of the fixed and axially movable belt pulleys, with respect to each other, has been determined, on one hand, by a pre-load apparatus and, on the other, by an apparatus acting in accordance with centrifugal force. The apparatus that acts in accordance with centrifugal force consists of small elements such as powdered steel, copper, etc. Said apparatus takes care that the force of the pre-load apparatus be reduced as the speeds increase. In other words, the distance from each other assumed by both belt pulleys is accordingly enlarged again as the speeds increase, that is, the belt pulley is opened. The consequence of this is a reduction of the speed of the driven shaft.

Based on the arrangement of DE 25 60 653 C2, the problem to be solved by this invention is to improve a drive device, especially for the driving of auxiliary aggregates of a motor vehicle, in the sense that the speed ratios to be adjusted be reproducible with sufficient exactness. The drive device according to the invention must be specially distinguished by a small hysteresis. Adding to the stated problem, the speeds of the drive device must be precisely controllable within wide limits.

The invention solves the stated problem by the fact that the chamber is connected to a reservoir of the hydraulic medium and the centrifugal action of the hydraulic medium contained in the chamber is used for increasing the speed of the driven shaft. While in the devices of the prior art, the effect of the centrifugal action upon the adjustment of the belt pulleys was regarded as an interference, the solution according to the invention makes use of the knowledge that the rotating portion of the hydraulic medium contained in the chamber builds up a pressure which exponentially increases with the radial distance from the axis of rotation and which—on account of this physical mathematical interrelationship—is especially suited to control very precisely the position of the belt pulleys with respect to each other. Practical tests have shown that the speed ratios are outstandingly reproducible. In the drive device according to the invention, three possible operation ranges basically result:

1. Below a ceiling speed a rigid speed ratio with speed-increasing ratio exists. The force of the pre-load apparatus of the first belt pulley outbalances the centrifugal force.

2. If a first ceiling speed is exceeded, the action of the centrifugal force out-balances the force of the pre-load apparatus of the first belt pulley. From here starts the governed range of the driven shaft (secondary speed).

3. The regulating distance of the second belt pulley is used up so that the axially movable belt pulley assumes its greatest distance from the axially fixed belt pulley. There again exists a fixed speed ratio with a speed reducing ratio.

To make use of the centrifugal action of the hydraulic medium contained in the chamber for increasing the speed of the driven shaft, it suffices to connect pressurelessly the chamber with the reservoir.

According to an advantageous feature of the invention, the governed range of the drive device can be enlarged in a simple manner by additionally applying supporting pressure to the chamber. With the added supporting pressure the drive device can be moved at high speeds along a characteristic line. Said characteristic line extends with almost the same inclination as the characteristic line in which the centrifugal action is exclusively used. When driving an auxiliary aggregate of a motor vehicle, the supporting pressure can be diverted without special expense from the feed pressure of a lubricant pump or it can correspond to said pressure.

The chamber for carrying the hydraulic medium can be formed in a structurally simple manner by slidingly and tightly passing a piston of the axially movable flange into an internal cylinder of the flange of the driven shaft. This type of construction makes possible also a simple adaptation of the governing characteristic of the drive device by a diameter of different size of the piston. By adequately selecting the diameter, the hydraulic medium contained in the chamber can easily be quantitatively varied.

In a preferred embodiment of the drive device of the invention, semicircular slots, diametrically opposite to each other by their axially oriented openings, have been provided in the axially movable flange and in the flange of the driven shaft. The openings form separate hollow bodies in which cylindrical bodies are inserted to produce a non-rotable connection between the axially movable flange and the flange of the driven shaft. This feature per se has been disclosed in DE 12 84 779 B2.

It is advantageous to design the driven shaft as a hollow shaft. The hollow shaft can be non-rotably connected or become connected with an output shaft directly or indirectly via a shiftable clutch. The output shaft can be the drive shaft of the auxiliary aggregate such as an air compressor. The shiftable clutch is preferably constructed as an electromagnetically actuatable clutch.

In a simple and easy to assemble construction of the chamber, a bottom is provided which abuts against the hollow shaft by an outer seal. Said bottom can be provided with a central bore through which the output shaft passes. Together with the outer seal, an inner seal is then to be provided. In this solution, the feed or discharge pipe passes through the output shaft into the chamber.

In order to fix the axially movable belt pulley exactly in its most open position of the pulley, the axially movable flange abuts in its end position against a stop of the flange of the driven shaft.

The feed or discharge pipe for the hydraulic medium can also be situated concentrically with respect to the flange of the driven shaft. In this case, the pipe is tightly passed through a bore of the flange of the driven shaft in such a manner that the flange of the driven shaft can rotate about the pipe.

In connection with the drive of an air compressor, it is advantageous to regulate the supporting pressure according to the performance characteristic of the internal combustion engine. This is done, in particular, by monitoring the engine speed dependent on the performance characteristic and/or the load pressure of the internal combustion engine and varying the transmission ratio of the drive device corresponding to said speed and/or said pressure. For this purpose, together with the change of the centrifugal action of the hydraulic medium, the supporting pressure is varied, connected or disconnected until a desired engine speed and/or loading pressure is measured.

It is also advantageous to design the flange of the driven shaft as drive pulley for another auxiliary aggregate. This can be, for instance, an air-conditioning compressor.

Other essential features of the invention and the advantages resulting therefrom are to be deduced from the description that follows of two embodiments of the invention. In the drawings.

Figure 1:
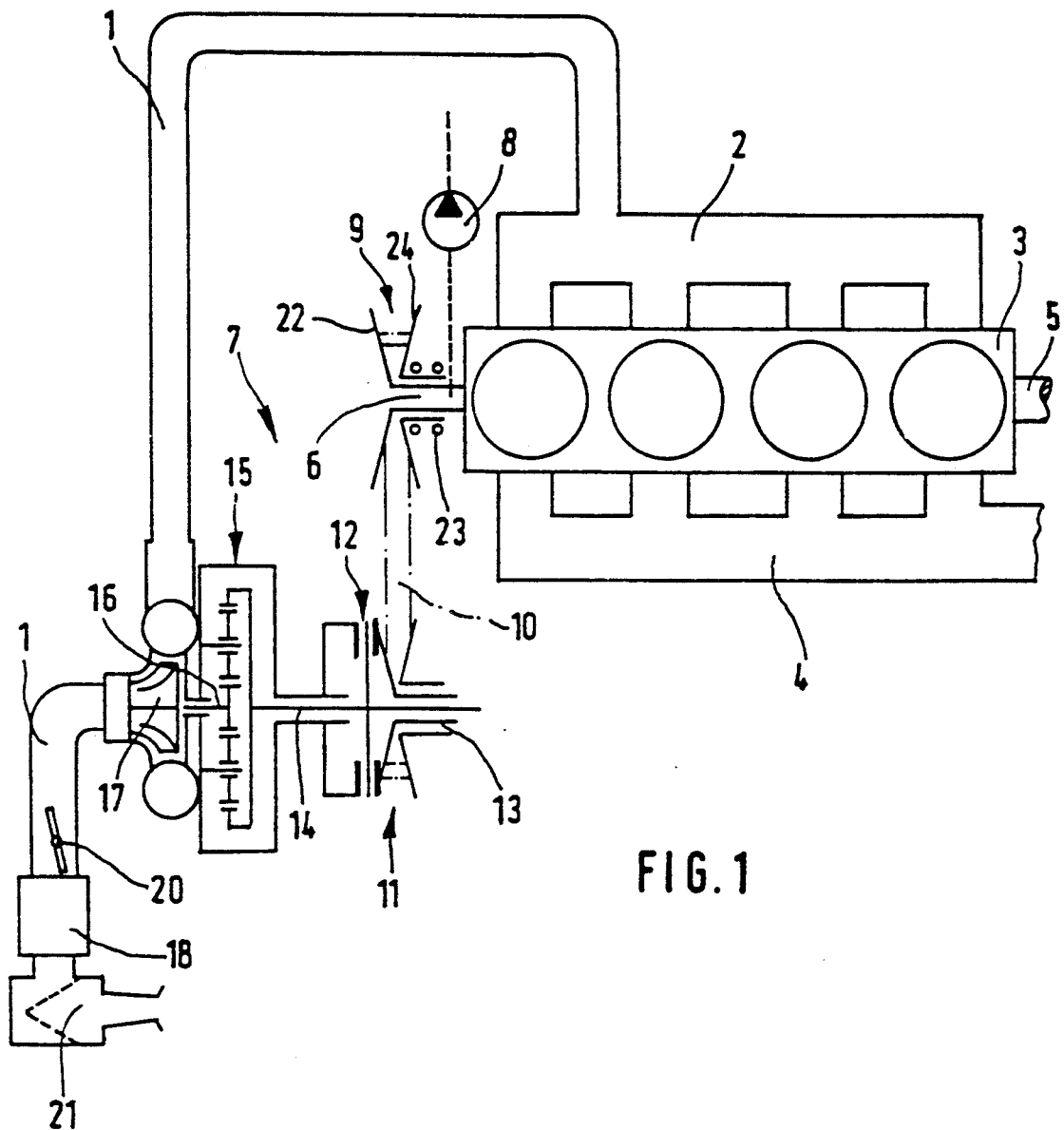
FIG. 1 is an internal combustion engine having a drive device for an auxiliary aggregate of a motor vehicle in very simplified diagrammatic representation.

The diagrammatic representation of FIG. 1 shows a drive device for operating an auxiliary aggregate in combination with an internal combustion engine of a motor vehicle.

A suction pipe 1 leads to an air distributor 2 of an internal combustion engine 3. Said internal combustion engine is an otto engine. But this arrangement, according to the invention, can in principle be also embodied in a diesel engine. An exhaust gas collector 4 is coordinated with the internal combustion engine 3.

An output shaft 5 is operatively connected with a transmission, itself not show. On the opposite side of the internal combustion engine is a drive shaft 6 of a drive device 7. Also derived from this shaft is the drive for a lubricant pump 8. When necessary, for reasons of space, the drive device 7 and the lubricant pump 8 can also be driven via an intermediate shaft.

A first belt pulley 9 of the drive device 7 drives a second belt pulley 11 via a belt 10.

A non-rotatable connection between the second belt pulley 11 and a driven shaft 13 with an output shaft 14 is produced by actuating an electromagnetic clutch 12. The output shaft 14 drives a high-driver planetary transmission 15. To increase the speed, a suitable transmission of a different type of construction can be used instead of a planetary transmission. A sun-wheel shaft 16 serves to drive a centrifugal compressor 17 which is within the suction pipe 1.

During idling speed and at low engine speeds, the second belt pulley 11 rotates slower than the first belt pulley 9. At maximum speed of the internal combustion engine 3, the system reaches a transmission ratio where the speed of the output shaft 14 is, as a rule, lower than the speed of the internal combustion engine. Since the output speed of the second belt pulley 11 for operating the centrifugal compressor 17 would not be sufficient, the high-driver planetary transmission has a high speed increasing ratio.

In the suction pipe 1 is an air meter 18. A throttle valve 20 is actuatable from its closed position up to a maximum opening angle.

The first belt pulley 9 of the drive shaft 6 consists of an axially fixed flange 22 non-rotably connected with the drive shaft 6 and a flange 24 axially movable under the action of a pre-load apparatus such as a compression spring.

Figure 2:
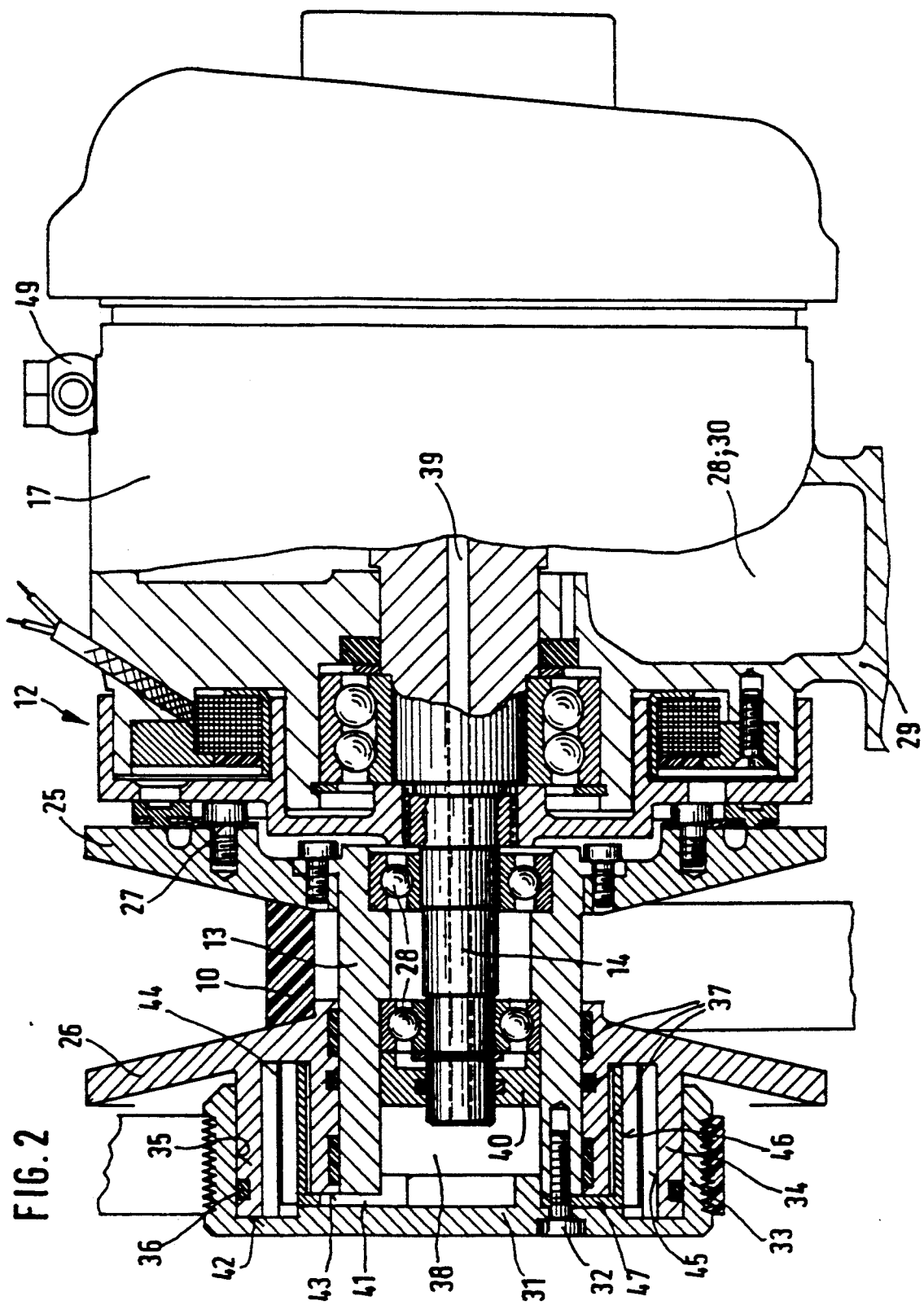
FIG. 2 is a longitudinal section of a belt pulley of the drive device according to FIG. 1.

The construction of the second belt pulley is explained herebelow with reference to FIG. 2.

The second belt pulley 11 is composed of an axially fixed flange 25 and an axially movable flange 26. The axially fixed flange 25 is non-rotably connected with the driven shaft 13 by suitable connecting means such as screws 27. In the shown embodiment, the driven shaft 13 is designed as hollow shaft and rotatably situated on the output shaft 14 via two bearings 28. The clutch 12 is designed as electromagnetically actuatable clutch. When the clutch 12 is engaged, a non-rotable connection is produced between the axially fixed flange 25 and the output shaft 14. As already mentioned, the output shaft 14 drives the high-driver planetary transmission 15 and the latter, in turn, drives the centrifugal compressor 17.

The outline of the centrifugal compressor 17 is shown diagrammatically in FIG. 2. The interior 28 of a housing 29 is provided as reservoir 30 for a hydraulic medium. The reservoir can easily be situated also outside the housing 29.

The axially movable flange 26 is opposite the axially fixed flange 25.

The driven shaft 13 has a flange 31 which is non-rotably connected by screwed connections 32 with the driven shaft 13. Other suitable non-rotable connections can be chosen instead of the screw connections.

The flange 31 of the driven shaft 13 has an axially oriented edge 33 which overlaps, in the manner of a cover, a piston 34 of the axially movable flange. The piston 34 is slidingly passed into an internal cylinder 35 of the flange 31. A seal 36 assumes the sealing of the piston 34 with respect to the internal cylinder 35.

It is advantageous, as shown in the drawings, to design the flange 31 as drive pulley for another auxiliary aggregate such as an air-condition compressor.

The axially movable flange 26 rests on the driven shaft 13 via sliding and sealing rings 37.

As mentioned already, the flange 26 is axially displaceable with respect to the driven shaft 13 and has a non-rotable connection to the driven shaft 13 in order to transmit the proportionate torque which results from the abutment of the belt 10 on said flange 26. The axial displacement and the non-rotable connection of the flange 26 are obtained by constructional steps explained herebelow:

The flange 31 is a component part of a chamber 38 which is provided to carry hydraulic medium and, for said purpose, is connected with a reservoir 30 via a feed and discharge pipe 39. An annular bottom 40, which is sealed with respect to the driven shaft 13 and the output shaft 14, forms the boundary of the chamber 38 which is opposite the flange 31. The hydraulic medium comes into contact with the operative flange of the piston 34 of the flange 26 via a radially orient duct 41.

The non-rotable connection between the flange 26 and the flange 31 of the driven shaft 13 results via cylindrical bodies 44, two of which are reproduced in the drawings. The cylindrical bodies 44 are inserted in semicircular grooves 45 of the flange 26 and semicircular grooves 46 of the flange 31. The semicircular grooves 45 and 46 face each other by their axially oriented openings so that the cylindrical bodies 44 can be easily accommodated. For production reasons, the semicircular grooves 46 of the flange 31 are situated in a separate swivel member 47 which is inserted when the flange 31 is connected with the driven shaft 13. It can be easily seen from the drawings, in relation to the foregoing explanation, that the flange 26 can perform an axial displacement movement with respect to the driven shaft 13. There exists a non-rotable connection of the flange 26 with the driven shaft 13. The cylindrical bodies 44 serve to transmit the torque.

Figure 3:
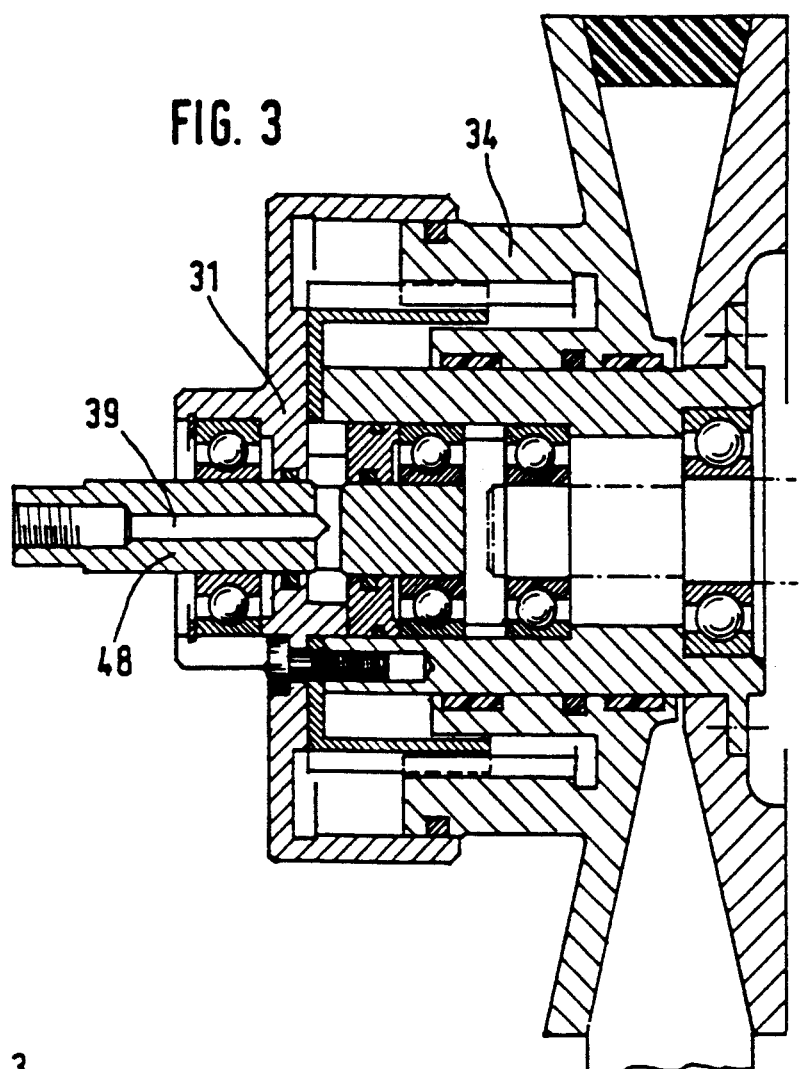
FIG. 3 is another embodiment of a belt pulley.

The construction of the second belt pulley illustrated in FIG. 3 corresponds fundamentally to the belt pulley of FIG. 2. But differing therefrom, the feed and discharge pipe 39 is situated in a separate connecting piece 48. Said connecting piece 48 is stationary placed and concentrically traverses the flange 31 so that the latter can rotate about the connecting piece 48. The illustration of FIG. 3 shows for the rest the belt pulley 11 in a position in which the flanges 25 and 26 assume their smallest distance from each other. In this position the piston 34 is farthest removed from the flange 31.

The second belt pulley 11 is adjusted as follows:

Since the internal cylinder unit 34-36 of the piston rotates with the driven shaft 13, the hydraulic medium contained in the chamber 38 is exposed to a centrifugal action. The rotating portion of hydraulic medium builds up a pressure which exponentially increases with the radial distance from the axis of rotation (longitudinal axis of the output shaft 14). The pressure built up by the centrifugal action exerts a contact pressure upon the end face of the piston 34 of the axially movable flange 26. Said contact pressure is speed dependent and changes with the second power of the speed. Below a certain ceiling speed, the pre-load force of the pre-load apparatus 23 of the first belt pulley 9 prevails. A fixed speed ratio exists between the first and second belt pulleys 9 and 11, specifically with a speed increasing ratio. If the ceiling speed of the driven shaft 13 is exceeded, the centrifugal action becomes increasingly noticeable. The speed ration between the first and second belt pulleys 9 and 11 is variable, as is to be deduced from the course of the characteristic line A in the illustration of FIG. 4. In said illustration are diagrammatically shown, over the engine speed, to the left the compressor speed and to the right the speed of the driven shaft 13. The course of the curve reproduces the governing characteristic which distinguishes itself mainly in that already in the range of low engine speeds there are relatively high speeds of the driven shaft 13. Said governing characteristic particularly meets the auxiliary aggregates to be driven of a motor vehicle.

When the regulating distance of the axially movable flange 26 has been used up, that is, the flanges 25 and 26 have assumed their smallest distance from each other, there results again a fixed speed ratio between the first and second belt pulleys 9 and 11 with a reducing speed ratio.

Figure 4:
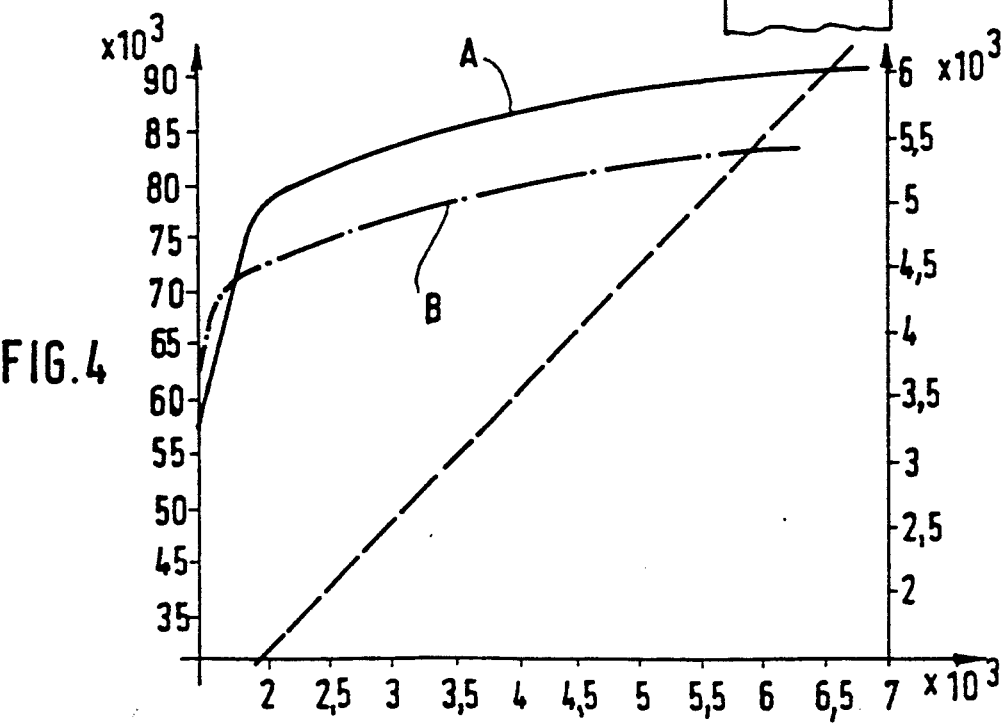
FIG. 4 is a diagrammatic representation of the speed ratios.

In FIG. 4 is plotted a characteristic line B which results when an additional supporting pressure is superposed on the contact pressure resulting from the centrifugal action. Said supporting pressure can be branched off, or correspond to, the lubricant pump 8 which is all the same present. A pipe leading away from the lubricant pump 8 (see FIG. 1) is connected by a fitting 49 to the housing 29 and a connecting pipe not shown is connected to the chamber 38 or the feed and discharge pipe 39.

In FIG. 4 the dashed line reproduces a linear speed course between the first and second belt pulleys 9 and 11 which results when the belt pulley is invariably closed. By virtue of the design according to the invention of the drive device 7, it is possible to adjust any desired speed ratio lying in the surface enclosed between the dashed line and the curve A or the curve B. This transmission ratio (curve A) of the drive device 7 can be adjusted according to the performance characteristic of the engine. For this purpose, the value of the supporting pressure can be varied when there is a deviation of a given desired value of the load pressure.

The use of the drive device 7 according to the invention is not limited to the driving of an air-charge compressor. The device can rather be used wherever it generally matters advantageously to use the explained governing characteristic deviating from linear ratios. This is particularly the case when auxiliary aggregates of a motor vehicle are driven.

| | Reference numerals |
|---|---|
| 1 | suction pipe |
| 2 | air distributor |
| 3 | internal combustion engine |
| 4 | exhaust collector |
| 5 | output shaft |
| 6 | drive shaft |
| 7 | drive device |
| 8 | lubricant pump |
| 9 | first belt pulley |
| 10 | belts |
| 11 | second belt pulley |
| 12 | clutch |
| 13 | driven shaft |
| 14 | output shaft |
| 15 | high-driver planetary transmission |
| 16 | sun-wheel shaft |
| 17 | centrifugal compressor |
| 18 | air meter |

-continued

| Reference numerals | |
|---|---|
| 19 | — |
| 20 | throttle valve |
| 21 | air filter |
| 22 | flange |
| 23 | pre-load apparatus |
| 24 | flange |
| 25 | flange |
| 26 | flange |
| 27 | screws |
| 28 | interior space |
| 29 | housing |
| 30 | reservoir |
| 31 | flange |
| 32 | screws |
| 33 | edge |
| 34 | piston |
| 35 | internal cylinder |
| 36 | seal ring |
| 37 | seal and sliding ring |
| 38 | chamber |
| 39 | feed and discharge pipe |
| 40 | bottom |
| 41 | duct |
| 42 | — |
| 43 | — |
| 44 | cylinder body |
| 45 | semicircular grooves |
| 46 | semicircular grooves |
| 47 | swivel |
| 48 | connecting piece |
| 49 | fitting |

We claim:

1. A drive device (7) for transmitting torque between a drive shaft (6) having a first belt pulley (9) and a driven shaft (13) having a second belt pulley (11) wherein said first belt pulley (9) has an axially fixed flange (22) non-rotably connected with said drive shaft (6) and a flange (24) axially movable under the action of a pre-load apparatus (23) and said second belt pulley (11) consists of an axially fixed flange (25) non-rotably connected with said driven shaft (13) and an axially movable flange (26), said axially movable flange (26) forming, with a flange (31) of said driven shaft (13), a chamber (38) which is connected with a reservoir (30) for a hydraulic medium, and to which can be applied a supporting pressure regulatable in accordance with a performance characteristic of an internal combustion engine (3), characterized in that by changing, connecting and disconnecting said supporting pressure, said engine speed dependent upon the performance characteristic and/or pressure load of said internal combustion engine (3) is monitored by the transmission ratio of said drive device (7) corresponding to said speed and/or said pressure is varied together with change of the centrifugal action of said hydraulic medium.

2. A drive device according to claim 1, characterized in that said supporting pressure is derived from, or corresponds to, the feed pressure of a lubricant pump (8).

3. A drive device according to claim 1, characterized in that a piston (34) of said axially movable flange (26) is slidingly and tightly passed into an internal cylinder (35) of said flange (31) of said driven shaft (13).

4. A drive device according to claim 1, characterized in that semicircular grooves (45, 46) are provided in said axially movable flange (26) and in said flange (31) of said driven shaft (13) which by their axially oriented openings face each other diametrically, and cylinder bodies (44) are inserted therein to produce a non-rotable connection between said axially movable flange (26) and said flange (31) of said driven shaft (13).

5. A drive device according to claim 1, characterized in that said driven shaft (13) is a hollow shaft non-rotably connected with an output shaft (14) directly or indirectly via a shiftable clutch (12).

6. A drive device according to claim 5, characterized in that a bottom (40), which with an outer seal abuts said hollow shaft (shaft 13), forms a boundary wall of said chamber (38).

7. A drive device according to claim 5, characterized in that said output shaft (14) drives an auxiliary aggregate of a motor vehicle, especially a centrifugal compressor (17) for an internal combustion engine (3).

8. A drive device according to claim 3, characterized in that said axially movable flange (26) abuts, in an end position, against a stop of said flange (31) of said driven shaft (13).

9. A drive device according to claim 1, characterized in that said hydraulic medium is fed to said chamber (38) and discharges therefrom via a bore (39) of said output shaft (14).

10. A drive device according to claim 1, characterized in that said hydraulic medium is fed to, or discharged from, said chamber (38) via a stationary pipe (39 in 48) situated concentrically with respect to said flange (31) of said driven shaft (13).

11. A drive device according to claim 1, characterized in that said flange (31) of said driven shaft is designed as drive pulley for another auxiliary aggregate, specially an air-conditioning compressor.

12. A drive device according to claim 4, characterized in that said semicircular grooves (46) are situated in a separate swivel member (47).

* * * * *